US007007491B2

(12) United States Patent
Grimm et al.

(10) Patent No.: US 7,007,491 B2
(45) Date of Patent: Mar. 7, 2006

(54) THERMAL MANAGEMENT SYSTEM FOR A VEHICLE

(75) Inventors: Mark Thomas Grimm, Dunlap, IL (US); Ryan Patrick McEnaney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/740,442

(22) Filed: Dec. 22, 2003

(65) Prior Publication Data

US 2005/0132736 A1 Jun. 23, 2005

(51) Int. Cl.
F25B 1/00 (2006.01)
F25B 49/00 (2006.01)
F25B 27/00 (2006.01)

(52) U.S. Cl. ............................ 62/230; 62/236; 62/244; 62/323.1; 165/10; 165/43; 165/236

(58) Field of Classification Search ................. 62/230, 62/236, 239, 244, 323.1, 430; 165/10, 43, 165/202, 236
See application file for complete search history.

(56) References Cited

U.S. PATENT DOCUMENTS

| 4,280,330 | A | * | 7/1981 | Harris et al. .................. 62/3.3 |
| 4,761,967 | A | * | 8/1988 | Sumikawa et al. ........... 62/201 |
| 6,059,016 | A | * | 5/2000 | Rafalovich et al. ........... 165/41 |
| 6,464,027 | B1 | | 10/2002 | Dage et al. |
| 6,616,059 | B1 | | 9/2003 | Sabhapathy et al. |
| 2003/0141049 | A1 | * | 7/2003 | Kennedy ..................... 165/202 |
| 2003/0201097 | A1 | | 10/2003 | Zeigler et al. |
| 2004/0168454 | A1 | * | 9/2004 | Iritani .......................... 62/230 |
| 2005/0003928 | A1 | * | 1/2005 | Niki et al. ....................... 477/5 |

* cited by examiner

Primary Examiner—Marc Norman
(74) Attorney, Agent, or Firm—Finnegan, Henderson, Farabow, Garrett & Dunner LLP

(57) ABSTRACT

A thermal management system for a vehicle includes an engine operable to generate energy. An energy storage unit may be associated with the engine and adapted to receive and store the energy generated by the engine. A temperature control unit may be associated with the energy storage unit and adapted to control a temperature in the vehicle. The temperature control unit may be adapted to selectively draw stored energy from the energy storage unit to control the temperature when the engine is not operating. A controller may be adapted to monitor an operating condition of the thermal management system and to control the transfer of the energy from the engine to the energy storage unit based on the monitored operating condition.

22 Claims, 6 Drawing Sheets

THERMAL MANAGEMENT SYSTEM FOR A VEHICLE

This invention was developed with government support under U.S. Government Contract No. DE-FC04-2000AL67017. Accordingly, the U.S. Government has certain rights to this invention.

TECHNICAL FIELD

This invention relates generally to a thermal management system, and more particularly to a thermal management system for a vehicle.

BACKGROUND

Truck drivers spend about 1800 hours per year resting in their cabs. In order to provide an environment suitable for resting and sleeping, the cabs are provided with heating and/or air conditioning units. Typically, drivers idle their truck engines while resting to provide power to operate the heating and air conditioning units. To idle such an engine for an extended period of time is an inefficient use of the engine and a waste of fuel.

For example, a typical on-highway truck burns approximately 0.6 to 0.9 gallons per hour while idling. Accordingly, fuel consumed during idling could be within the range of 1665 gallons per year. Further, the truck engines are designed and built to operate optimally at highway speeds. They may vibrate and cause uneven or undesired noise levels while idling. Additionally, extended idling may have negative effects on engine life.

Recently, federal and state governments began legislating new and higher standards for fuel emissions. Recognizing that the practice of idling while resting results in inefficient fuel consumption and additional emissions from the engine into the air, federal and state governments, along with industry, are looking for a solution to reduce truck idling during resting.

One system designed to reduce the need for truck idling during a rest period allows a truck operator to use an air conditioning or heating feature whether or not the engine is operating. This is accomplished by powering an HVAC system with a vehicle storage battery. While driving, the vehicle storage battery may be charged using a charging system. When the truck engine is shut down and the heating or air conditioning features are used, the HVAC draws energy from the storage battery.

Such a system, although an improvement over the prior art, still has many drawbacks. For example, as the energy level in the battery decreases, the HVAC may no longer be able to operate. Furthermore, such a system may direct energy generated by the engine to a recharger instead of providing the maximum amount of energy for driving the truck such as, for example, when a truck is going uphill and needs the maximum amount of energy.

The present invention addresses one or more of the deficiencies in the prior art.

SUMMARY OF THE INVENTION

In one aspect, the present disclosure is directed to a thermal management system for a vehicle. The thermal management system may include an engine operable to generate energy. An energy storage unit may be associated with the engine and adapted to receive and store the energy generated by the engine. A temperature control unit may be associated with the energy storage unit and adapted to control a temperature in the vehicle. The temperature control unit may be adapted to selectively draw stored energy from the energy storage unit to control the temperature when the engine is not operating. A controller may be adapted to monitor an operating condition of the thermal management system, and control the transfer of the energy from the engine to the energy storage unit based on the monitored operating condition.

In another aspect, the present disclosure is directed to a method for managing a thermal system for a vehicle. The method includes the steps of generating energy with an engine and transferring the energy from the engine to an energy storage unit. The method also includes the steps of storing the transferred energy in the energy storage unit and selectively drawing the stored energy from the energy storage unit to control a temperature in the vehicle when the engine is not operating. The method still further includes monitoring an operating condition of the system and controlling the transfer of the energy from the engine to the energy storage unit based on the monitored operating condition.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Figure 1:
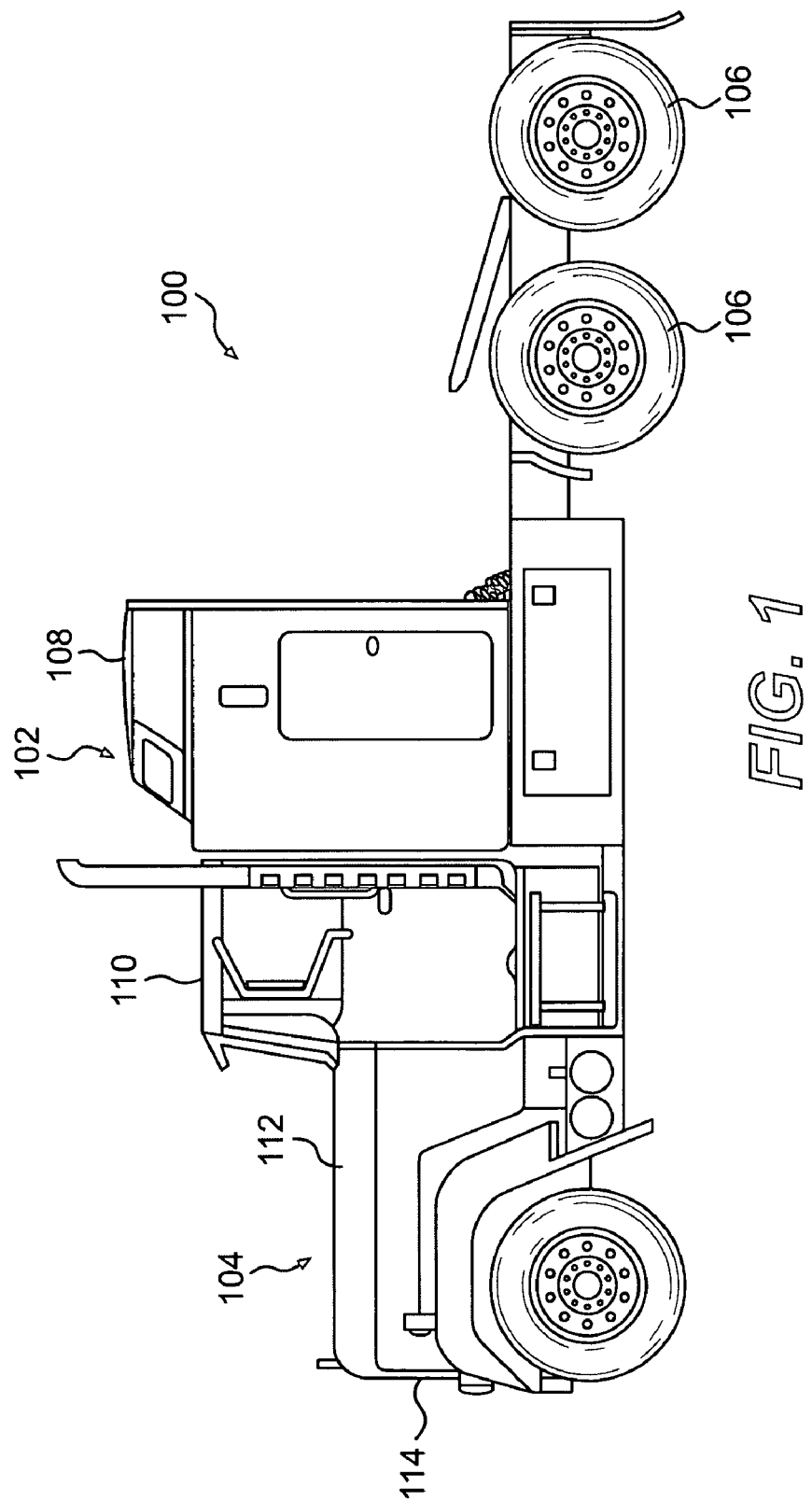
FIG. 1 is a pictorial representation of a vehicle for the thermal management system of this disclosure.

An exemplary embodiment of a vehicle 100 is illustrated in FIG. 1. The vehicle 100 may be an on-highway truck, an off-highway truck, or other vehicle. In the exemplary embodiment shown, the vehicle 100 includes an operator compartment 102, a propulsion system housing 104, and driving wheels 106. The operator compartment 102 may include a cabin 108 and a cab 110. The cabin 108 may be used as resting quarters for an operator of the vehicle 100. It may include a bed and/or other accommodations, as is known in the art. The cab 110 may be used by an operator when driving the vehicle 100.

The propulsion system housing 104 may include a hood 112 and a grill 114. An engine and/or other driving components may be contained within the propulsion system housing 104, as is known in the art. Additionally, the propulsion system housing 104 may contain one or more components of a thermal management system.

Figure 2:
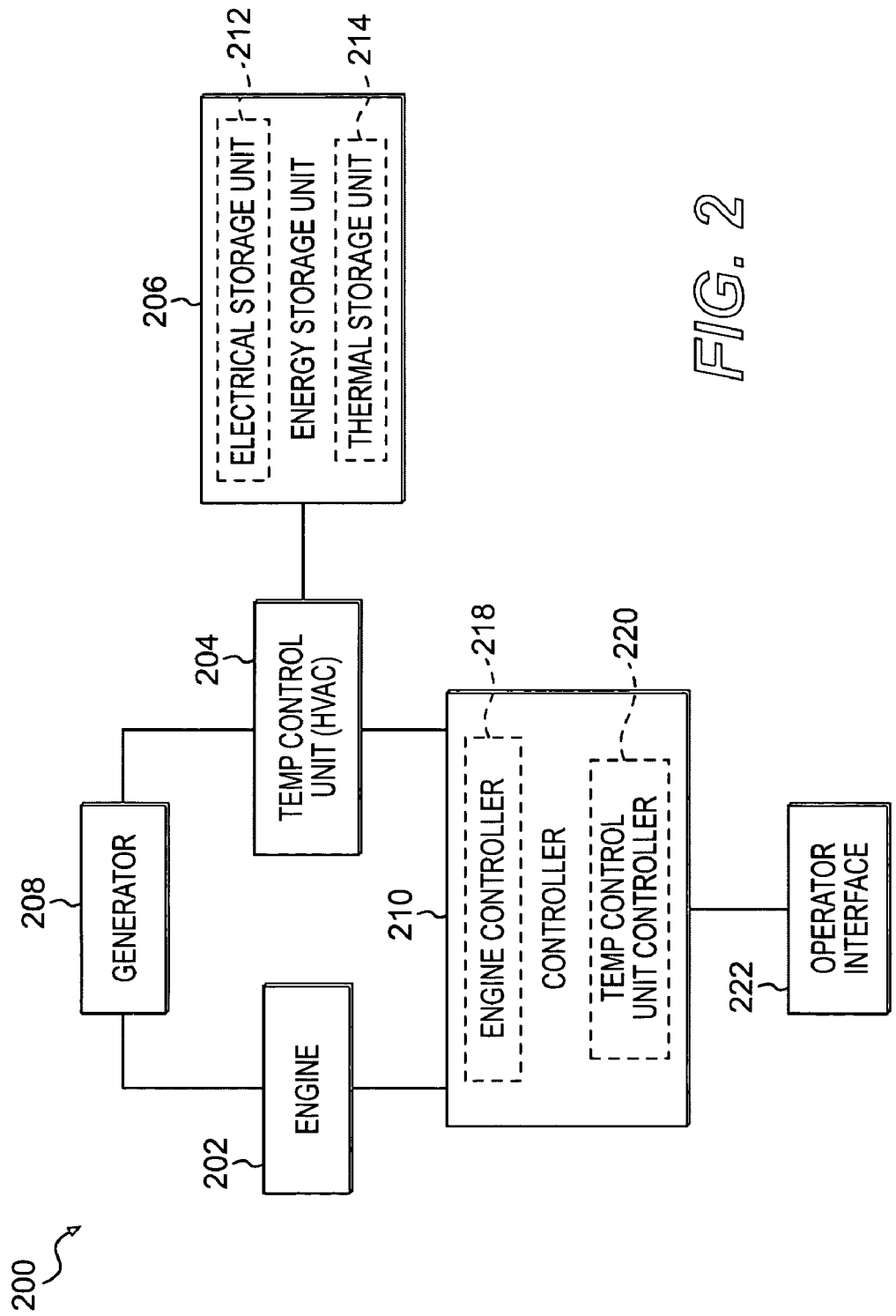
FIG. 2 is a block diagram of an embodiment of the thermal management system of the present invention.

One exemplary embodiment of a thermal management system 200 is shown in FIG. 2. Any component of the thermal management system 200 may be housed within the propulsion system housing 104 of the vehicle 100. Alternatively, components of the thermal management system 200 may be housed or contained at other locations about the vehicle 100. For example, some components may be housed at the rear of the cabin 108. Other components may be stored below the operator compartment 102. Additional components may be housed or contained within the operator compartment 102 for use and access by the operator.

Turning to FIG. 2, the thermal management system 200 may include an engine 202, a temperature control unit 204, an energy storage unit 206, a generator 208, and a controller 210. The thermal management system may be used on the vehicle 100 to provide heating and air conditioning to the operator compartment 102. Further, the thermal management system 200 may include smart technology in the controller 210 that allows the thermal management system 200 to efficiently transfer energy from the engine 202 to the energy storage unit 206 and provide comfort to the operator in the operator compartment 102, whether or not the engine 202 is operating.

In one exemplary embodiment, the engine 202 may be an internal combustion engine used to power the wheels 106 and other components of the vehicle 100, as is known in the art. Alternatively, the engine 202 may be an electric motor. The engine 202 may be configured to provide power to operate the thermal management system 200.

The temperature control unit 204 may be a heating, venting and air conditioning unit (HVAC). It may be associated with the vehicle 100 in a manner to provide heat and air conditioning to the operator compartment 102. In one embodiment, the temperature control unit 204 is a modular control unit containing most or all its major components in a single housing or location. In another embodiment, the temperature control unit 204 includes components distributed about the vehicle 100. At least some components of the temperature control unit 204 may be housed within the operator compartment 102 and may draw outside air through vents in the side of the operator compartment 102, such as in the side of the cabin 108.

Figure 3:
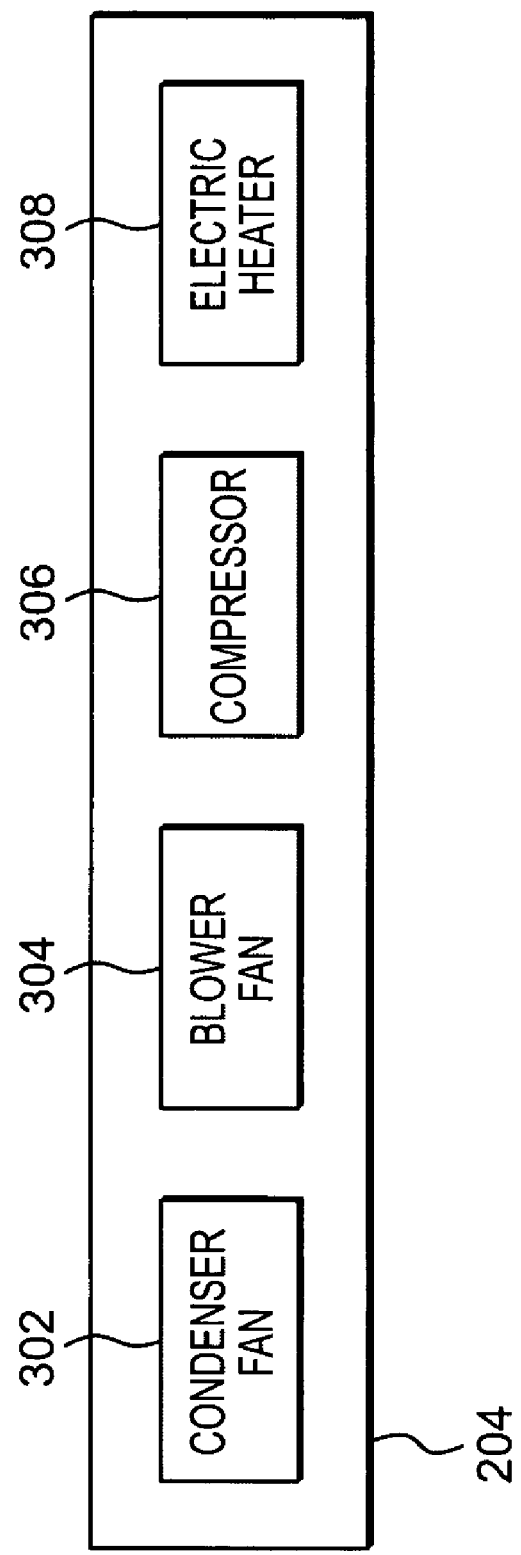
FIG. 3 is a block diagram of an exemplary temperature control unit in accordance with this disclosure.

FIG. 3 shows one exemplary embodiment of the temperature control unit 204. As shown in FIG. 3, the temperature control unit may include a condenser fan 302, a blower fan 304, a compressor 306, and an electric heater 308. In one exemplary embodiment, the blower fan 304 is configured to provide cooled or heated air into the operator compartment 102. The temperature control unit 204 may include other or additional components as would be apparent to one skilled in the art.

The condenser fan 302 and the blower fan 304 may be powered by variable speed motors to allow the temperature control unit 204 to be adjusted to provide a desired amount of heat and/or air conditioning. The compressor 306 may also be a variable speed compressor configured to operate at a designated speed to provide a desired amount of cooling.

Returning to FIG. 2, the generator 208 may be associated with the engine 202 in a manner to convert rotational energy generated by the engine 202 to electrical energy. The electrical energy from the generator 208 may power the temperature control unit 204. The generator 208 may be any generator, sized and selected to provide sufficient energy from the engine 202 to operate the temperature control unit 204 based on the requisite power requirements. In one exemplary embodiment, the generator 208 may be configured to power other components and accessories associated with the vehicle 100.

The energy storage unit 206 may be directly connected to the temperature control unit 204, and may be configured to provide power to operate the temperature control unit 204 when the temperature control unit 204 is receiving an insufficient amount of power from the generator 208. Accordingly, the energy storage unit 206 may selectively provide power to the temperature control unit 204. In an alternate exemplary embodiment, the temperature control unit 204 is configured to operate on power drawn from the energy storage unit 206 at all times.

The energy storage unit 206 may include, for example, one or both of an electrical storage unit 212 and a thermal storage unit 214. In one exemplary embodiment, the electrical storage unit 212 is a dedicated battery configured to provide power to operate the temperature control unit 204. The thermal storage unit 214 may also be a dedicated unit configured to provide energy to the temperature control unit 204. The electrical and thermal storage units 212, 214 may be any storage units known in the art. In one exemplary embodiment, a standard vehicle battery may be used as the energy storage unit 206. In this embodiment, the battery also may be used to provide power to start the engine 202 and control other functions on the vehicle 100.

In the exemplary embodiment shown, the energy storage unit 206 is configured to receive power from the generator 208 through the temperature control unit 204. Accordingly, the temperature control unit 204 acts as a conduit for energy being sent to the energy storage unit 206 for storing. In other exemplary embodiments, the energy may be sent directly from the generator 208 to the energy storage unit 206, bypassing the temperature control unit 204. In these embodiments, the energy storage unit 206 may be controlled by the controller 210, or alternatively, may include its own controller and/or system for gauging the stored energy level.

A controller 210 may be configured to monitor and control the engine 202, the temperature control unit 204, and/or the energy storage unit 206. The controller may be a single modulated unit or, in one exemplary embodiment, may be one or both of an engine controller 218 and a temperature control unit controller 220, with the engine controller 218 directly associated with the engine 202 and a temperature control unit controller 220 directly associated with the temperature control unit 204.

The controller 210 may include a computer having all the components required to run an application, such as, for example, a memory serving as a storage device and a processor serving as a central processing unit. One skilled in the art will appreciate that this computer can contain additional or different components. Furthermore, although aspects of the present invention are described as being stored in the memory of the controller 210, one skilled in the art will appreciate that these aspects can also be stored on or read from other types of computer programs, products, or computer readable media, such as computer chips and secondary storage devices, including hard disks, floppy disks, CD-Rom, or other forms of RAM or ROM.

The controller 210 may be configured to monitor operating conditions of the engine 202 and/or the temperature control unit 204 and/or the energy storage unit 206. In one exemplary embodiment, the controller 210 may be configured to determine the efficiency level of the engine 202. This may be determined based upon a fuel consumption of the engine 202 or alternatively, based upon a torque provided by the engine 202, as monitored by the controller 210.

Furthermore, the controller 210 may be configured to determine when the engine efficiency level is above a given threshold level and to direct excess energy through the temperature control unit 204 for storage in the energy storage unit 206. Likewise, the controller 210 may be configured to determine when the engine efficiency falls below a threshold level and to stop directing excess energy to the energy storage unit during that time.

The controller 210 also may be configured to monitor an energy level of the energy storage unit 206. This may be monitored at the temperature control unit 204 or alternatively, at the energy storage unit 206 itself. The controller 210 may be configured to compare the level of energy to a threshold energy level to determine when the energy storage unit 206 should be recharged.

Additionally, the controller 210 may be configured to determine when heating or cooling is required by the temperature control unit 204. It may be configured to compare an operator requested temperature to an actual temperature within the operator compartment 102. This determination may be based upon a sensor reading, such as by a temperature gauge within the operator compartment 102. Based upon the temperature readings, the controller 210 may be adapted to determine when additional cooling or heating is required to provide a desired temperature within the operator compartment 102.

In one exemplary embodiment, the controller 210 is configured to control the adjustable speed compressor 306 of the temperature control unit 204 to operate at a first speed when the engine efficiency level is at a first level, and to operate at a second level when the engine efficiency level is at a second level. Accordingly, in one exemplary embodiment, the controller 210 may be configured to reduce the energy consumed by the compressor 306 as the efficiency level of the engine 202 decreases, and to provide additional energy to the compressor when the efficiency level of the engine 202 increases.

Different operating functions may be provided and selected within the controller 210 by an operator to direct the controller 210 and thermal management system 200 to perform certain commands. For example, one function may be to recharge the energy storage unit 206 when the energy level falls below a threshold level. The controller 210 may be configured to recharge the energy storage unit 206 at times when an engine efficiency level is above the threshold efficiency level. In another example, the controller 210 may be configured to perform an operating function that may include monitoring the engine 202 to determine whether the engine 202 is running. If the engine is not running, and the energy level is below the threshold energy level, the controller may be configured to start the engine 202 to provide additional energy to the energy storage unit 206 and/or the temperature control unit 204. When the energy level is recharged to a designated threshold, such as fully charged, the controller 210 may be configured to shut down the engine 202.

In another example, the operating function may be a function that provides energy to operate the temperature control unit 204 for a designated period of time. In this embodiment, the controller 210 may be configured to monitor the level of energy within the energy storage unit 206 and determine whether the energy level is high enough to operate the temperature control unit 204 for a set length of time, such as, for example, for four hours. If the energy level is insufficient to power the temperature control unit 204 for the set length of time, the controller 210 may be configured to operate the engine 202 to charge the energy storage unit 206 until the energy level is sufficient to operate the temperature control unit for the set length of time. When enough power is stored in the energy storage unit 206, the controller 210 may shut down the engine 202 and the temperature control unit 204 may continue to operate based upon the energy provided by the energy storage unit 206.

An operator interface 222 may be associated with the controller 210. It may be configured to provide an input from an operator to the controller 210 to operate the temperature control unit 204. Some sample inputs may include a desired temperature, an operating function, a/c, heat, air recirculation, and/or any other feature that may be used with an HVAC system. The operator interface 222 may be any type of input device with input mechanisms that may include, for example, levers, buttons, switches, and/or dials that are adapted to allow the operator to change the output of the temperature control unit 204.

In one exemplary embodiment, the operator interface 222 may also include a display or LCD display that allows an operator to view operating conditions and/or other information such as, for example, a temperature within the operator compartment and/or outside the vehicle 100. Accordingly, through the operator interface 222, an operator in the vehicle 100 may control the thermal management system 200. The operator interface 222 may include more than one interface, such that one interface may be housed for access by an operator within the cabin 108 while another interface may be housed within the cab 110. Therefore, the operator may control the thermal management system 200 from anywhere within the operator compartment 102.

Figure 4:
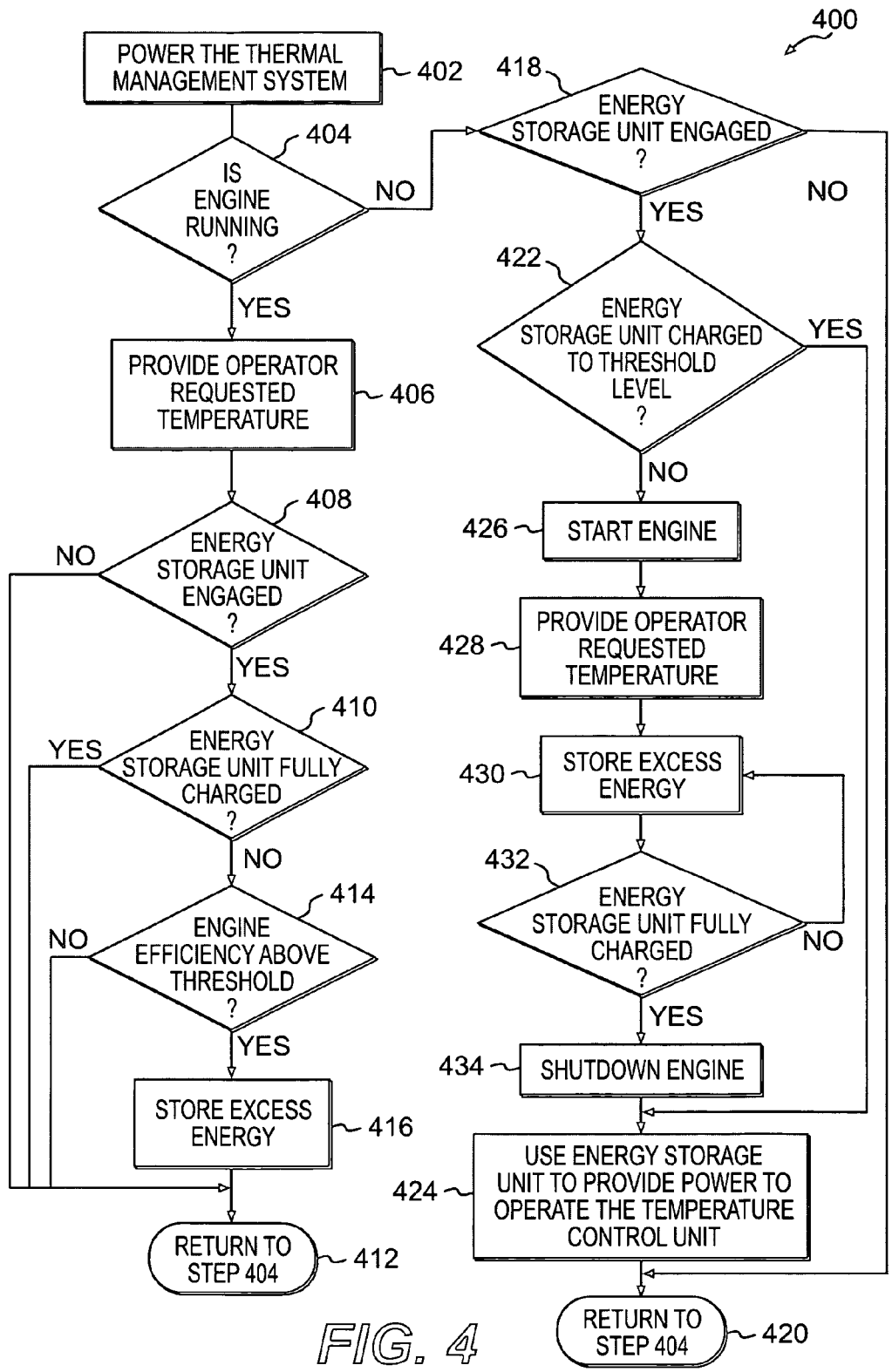
FIG. 4 is a flow chart illustrating an exemplary method of managing a thermal system in accordance with this disclosure.
Figure 5:
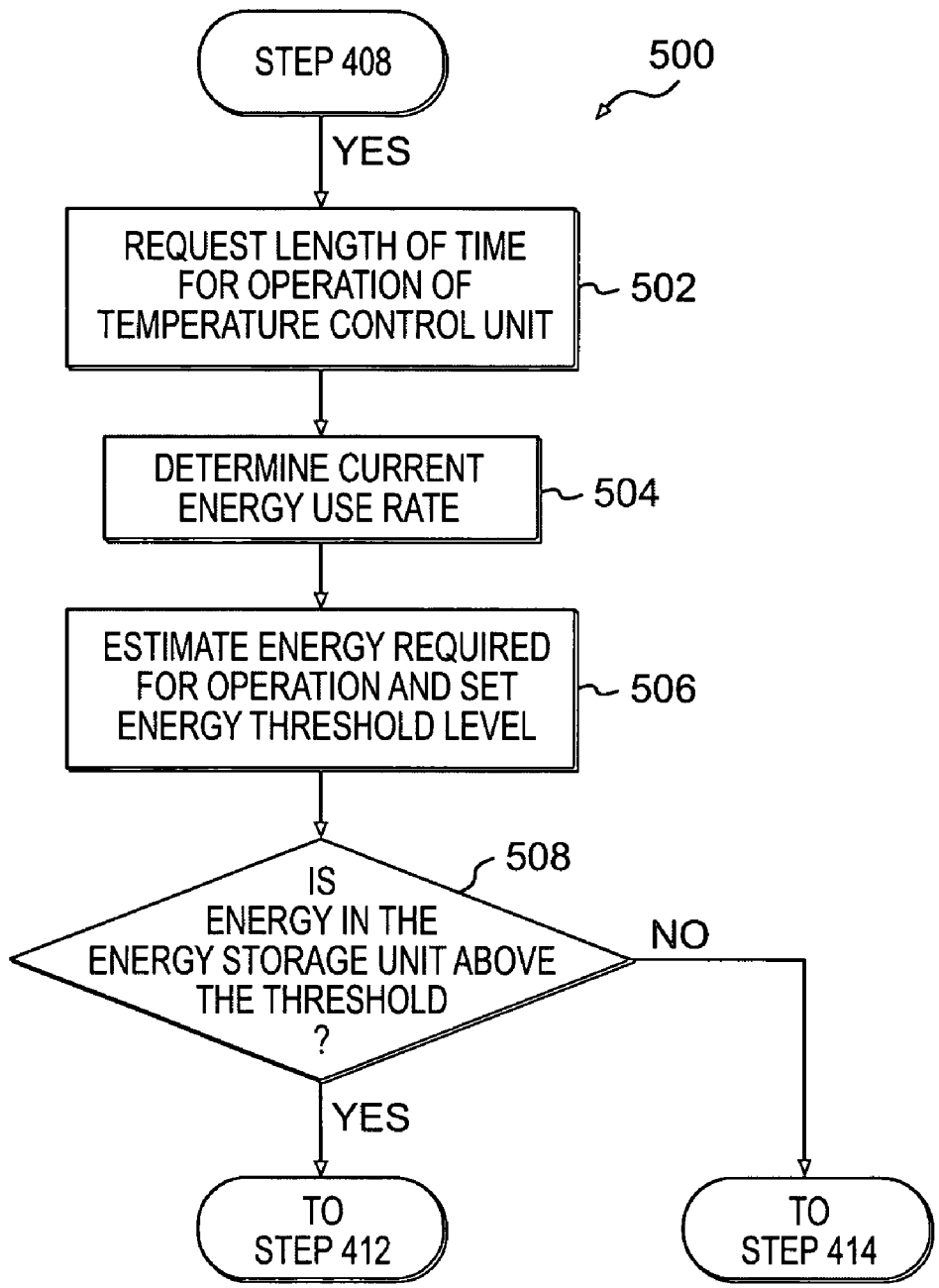
FIG. 5 is a second flow chart illustrating an exemplary method of managing a thermal system in accordance with this disclosure.
Figure 6:
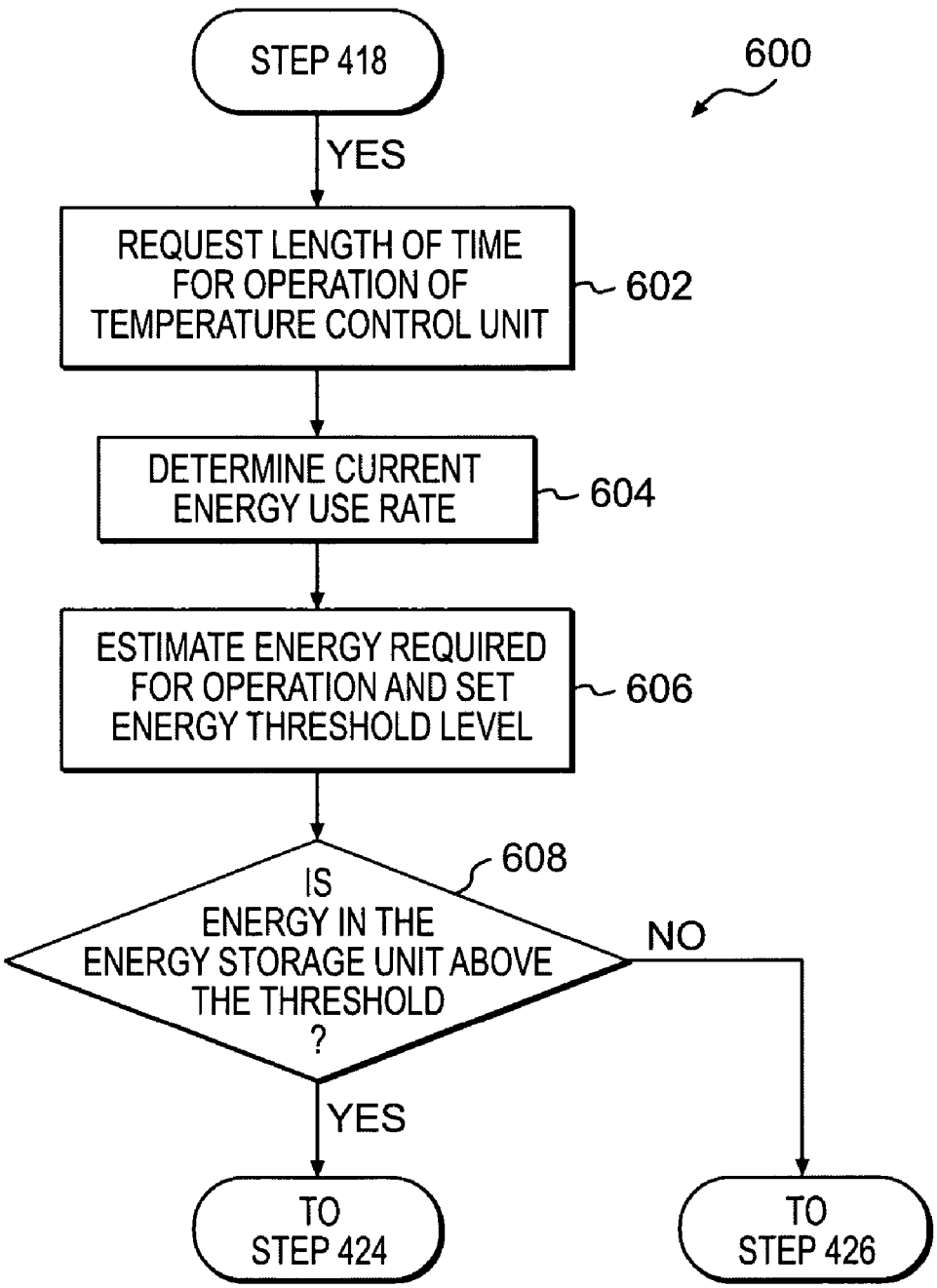
FIG. 6 is a third flow chart illustrating an exemplary method of managing a thermal system in accordance with this disclosure.

The flow charts of FIGS. 4–6 illustrate exemplary methods of operating the thermal management system 200.

INDUSTRIAL APPLICABILITY

The thermal management system 200 may be used to control a climate in the operator compartment 102 by providing heating and cooling to the operator compartment 102 of the vehicle 100. Furthermore, the thermal management system 200 may be configured to provide optimal recharging so that recharging of the thermal management system occurs at times when the engine 202 is operating above a threshold efficiency level, thereby being capable of generating excess energy. Accordingly, the thermal management system 200 may be configured to selectively recharge a depleted energy storage unit 206 with the excess energy. Further, the temperature control unit 204 may allow an operator in the operator compartment 102 to generate commands based on functions of the thermal management system 200 that the thermal management system will automatically carry out. It is contemplated that the concept described in this method and in the present disclosure may be applied to all vehicle types, including off-highway trucks, on-highway trucks, and other vehicles.

As described in the method shown in the flow chart 400, the thermal management system 200 is used to control the climate in the operator compartment 102. At a step 402, the operator powers the thermal management system 200. Powering the thermal management system 200 may include, for example, flipping a switch, starting the engine 202, or providing an input to the operator interface 222. In one exemplary embodiment, the thermal management system 200 is always operating.

At a step 404, the controller 210 determines whether the engine 202 is running. If the engine 202 is running, then the controller 210 may provide an operator requested temperature to the temperature control unit 204 at a step 406. The operator requested temperature may be entered by an operator through the operator interface 222. As stated above, this may be accomplished using, for example, buttons, dials, levers, or other input devices in a manner known in the art.

At a step 408, the controller 210 monitors the temperature control unit 204 to determine whether the energy storage unit 206 is engaged. For purposes of this disclosure, the energy storage unit 206 is engaged when it is providing energy to the temperature control unit 204 to perform an air treating function. If at step 408, the energy storage unit 206 is not engaged, then the system takes no action and advances to step 412, which returns to step 404. The return step 412 may return the method or the logic within the controller 210 to the beginning of a sequence or cycle such as for example, to step 404 to determine whether the engine 202 is running.

If the energy storage unit 206 is engaged at step 408, the controller 210 determines whether the energy storage unit 206 is fully charged, at a step 410. Charging may be accomplished by transferring energy from the generator 208, through the temperature control unit 204, to the energy storage device 206. Alternatively, the energy may bypass the temperature control unit 204, transferring energy to the energy storage unit 206 by other methods, such as by direct transfer. If the energy storage unit 406 is fully charged, then the system takes no action and returns as shown at step 412.

If however, the energy storage unit 406 is not fully charged at step 410, then the controller 210 determines whether the efficiency of the engine 202 is above a pre-established threshold at a step 414. The threshold may be preset using the operator interface 222 or alternatively, may be preset during, inter alia, manufacturing of the thermal manufacturing system 200. Determining whether the efficiency level is above a threshold may be accomplished by monitoring the specific fuel consumption, monitoring the torque, or monitoring other operating conditions of the engine 202. Based on the monitored operating condition, the controller 210 may determine the efficiency level of the engine 202. For example, when fuel consumption is high, the controller 210 may be configured to determine that transferring energy from the generator 208 through the temperature control unit 204 to the energy storage unit 206 for storage, may not be ideal because the maximum amount of energy may be required to propel the vehicle 100. In one exemplary embodiment, the threshold may be established so that the controller 210 directs excess energy from the engine 202 only when the efficiency level is about the equivalent of an efficiency level when the vehicle 100 is traversing level ground.

If at step 414, the engine efficiency level is not above the threshold level, then the controller 210 takes no action and returns to step 404, as shown at step 412. However, if at step 414 the engine efficiency is above the threshold as determined and monitored by the controller 210, then the controller 210 directs excess energy to the energy storage unit 406 for storage at a step 416. Storing excess energy may be accomplished by providing energy from the generator 208 through the temperature control unit 204 to the energy storage unit 206, as controlled by the controller 210. The energy may be stored as electrical or as thermal energy. Accordingly, the energy storage unit 206 could include one or both of the electrical storage unit 212 and the thermal storage unit 214.

Returning to step 404, if the engine is not running, the controller 210 may determine whether the energy storage unit 406 is engaged at a step 418. If the energy storage unit is not engaged, then the system takes no action, and the method returns to step 404, as shown at a step 420. If at step 418, the energy storage unit 406 is engaged, the controller 210 determines whether the energy storage unit 206 is charged to a threshold level at a step 422. The threshold level could be a fully charged level or other level, as programmed in the controller 210. If at step 422, the energy storage unit is charged to the threshold level, then the controller 210 controls the temperature control unit 204 to draw power from the energy storage unit 206 to control the temperature within the operator compartment of the vehicle 100, at a step 424.

If at step 422, the energy storage unit 406 is not charged to the threshold level, the controller 210 may automatically start the engine 202 to provide power to the temperature control unit 204, and to recharge the energy storage unit 206, at a step 426. The term "automatically," as used herein, means the controller 210 performs the function without additional input from an operator. The controller 210 may start the engine 202 using control logic and/or control systems.

At a step 428, the temperature control unit 204 may operate to cool or heat the operator compartment 102 to the requested temperature. During this time, in one exemplary embodiment, energy for controlling the temperature control unit 204 may be provided by the engine 202 and the generator 208. In another exemplary embodiment, the temperature control unit 204 draws energy from the energy storage unit even as it is being recharged. At a step 430, the controller 210 directs excess energy to the energy storage unit 206. Accordingly, in one exemplary embodiment, power provided by the generator 208 may be directed to the temperature control unit 204, with any excess power being sent to the energy storage unit 206 to recharge it.

At a step 432, the controller 210 may monitor the energy level of the energy storage unit 206 to determine whether the energy storage unit 206 is at a threshold power level, such as, in this example, a fully charged level. If at step 432, the energy storage unit 206 is not fully charged, then the system continues to store excess energy at step 430. If, however the energy storage unit 206 is fully charged, then the controller 210 may automatically shutdown the engine 202 at a step 434.

When the engine 202 is shutdown, the temperature control unit 204 may continue to operate if desired, drawing power from the energy storage unit 206, as shown at step 424. Accordingly, temperatures within the operator compartment 102 may be maintained or changed as desired by the operator.

Additional exemplary methods are described with reference to flow charts 500 and 600 shown in FIGS. 5 and 6. The methods in the flow charts 500, 600 may be additional functions or modes operable by the controller 210. The methods are described as methods operable within the method described with reference to FIG. 4, and may include many of the same method steps and features described with reference to FIG. 4. The method of flow chart 500 may be performed when the engine 202 is running, at step 404 of FIG. 4, while the method of flow chart 600 may be performed when the engine 202 is not running at step 404. However, the methods of flow charts 500, 600 could also be operable independent of many of the method steps of flow chart 400, and may be used in conjunction with other methods and flow charts that will be apparent to one skilled in the art.

The flow charts 500 and 600 describe methods that allow an operator to designate how much energy is to be stored in the energy storage unit 206. Accordingly, if the operator intends to rest for a short period of time, the thermal management system 200 may be configured to charge only until the energy storage unit 206 has sufficient energy to operate the temperature control unit 204 for that period of time.

The flow chart 500 begins at step 408, as shown in FIG. 5. In the method shown in the exemplary flow chart 500, if at step 408, the energy storage unit 206 is engaged, then an operator may request a desired length of time for operation of the temperature control unit 204, at step 502. For example, the operator may desire to rest for a four hour period, and therefore, desire that the temperature in the operator compartment be controlled for the four hour period. The desired length of time may be entered through the operator interface 222, in communication with the controller 210.

At step 504, the controller 210 may determine the current energy consumed by the temperature control unit 204 at its current setting. For example, the controller 210 may determine that the system is consuming energy at a rate of 5000 BTUs per hour. At a step 506, the controller may estimate the amount of energy required to operate the temperature control unit 204 for the set period. For example, to operate a temperature control unit 204 for four hours at 5000 BTUs per hour would require 20,000 BTUs. The controller 210 may then set the energy threshold level at the estimated required energy level, which in the example is 20,000 BTUs. Other methods of determining a required energy level would be apparent and are intended to be within the scope of the appended claims.

At a step 508, the controller 210 determines whether the energy level of the energy storage unit 206 is above the threshold level. If the energy level is above the threshold, then the method returns to step 412 of the flow chart 400. As shown in FIG. 4, at step 412, the controller 210 takes no action to store additional energy because the energy storage unit has enough energy to operate the temperature control unit for the desired period. If at step 508, the energy level of the energy storage unit 206 is not above the threshold level, then the flow chart returns to step 414 of FIG. 4. As shown in FIG. 4, at step 414, the controller 210 determines whether the engine efficiency is above the efficiency threshold. The method may then continue as described in flow chart 400.

With reference to FIG. 6, a method of storing energy for a period of time when the engine is not running will be described. The flow chart 600 begins at step 418, as shown in FIG. 6. In the method shown in the exemplary flow chart 600, if at step 418 the energy storage unit is engaged, then the operator may request a desired length of time for operation of the temperature control unit 204, at step 602. At step 604, the controller 210 may determine the current energy being used by the temperature control unit 204 at its current setting. At a step 606, the controller may estimate the amount of energy required to operate the temperature control unit 204 for the set period and establish a threshold level.

At a step 608, the controller 210 may determine whether the energy level of the energy storage unit 206 is above the threshold level. If the energy level is above the threshold level, then the method returns to step 424 of the flow chart 400. At step 424, the temperature control unit 204 may draw energy for operation from the energy storage unit 206. If at step 608 the energy level is not above the threshold, then the method returns to step 426 of the flow chart 400. At step 426, the controller 210 starts the engine 202 to provide additional energy to operate the temperature control unit 204 and/or recharge the energy storage unit 206.

It will be apparent to those skilled in the art that various modifications and variations can be made in the disclosed system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A thermal management system for a vehicle, comprising:
   an engine operable to generate energy;
   an energy storage unit associated with the engine and adapted to receive and store the energy generated by the engine;
   a temperature control unit associated with the energy storage unit and adapted to control a temperature in the vehicle, the temperature control unit being adapted to selectively draw stored energy from the energy storage unit to control the temperature when the engine is not operating; and
   a controller adapted to monitor an operating condition of the thermal management system, and to control the transfer of the energy from the engine to the energy storage unit based on the monitored operating condition.

2. The thermal management system of claim 1, wherein the monitored operating condition is an efficiency level of the engine, and the controller is adapted to transfer energy from the engine to the energy storage unit when the engine is operating above a threshold efficiency level.

3. The thermal management system of claim 1, wherein the controller is configured to transfer energy from the engine to the energy storage unit when the energy level in the energy storage unit falls below a threshold energy level.

4. The thermal management system of claim 1, wherein the monitored operating condition is an energy level of the energy storage unit, and the controller is adapted to turn off the engine and stop the transfer of energy when the energy level of the energy storage unit reaches a threshold energy level.

5. The thermal management system of claim 4, wherein the controller is further adapted to start the engine and transfer energy when the energy level of the energy storage unit falls below a threshold energy level.

6. The thermal management system of claim 1, further including an operator interface in communication with the controller, the operator interface being configured to receive a command as an input from an operator and send the command to the controller, wherein the controller is adapted to automatically control the transfer of the energy from the engine to the energy storage unit in response to the command.

7. The thermal management system of claim 6, wherein the command is a desired length of time for maintaining the temperature, and wherein the controller is adapted to determine an amount of energy required to maintain the temperature for the desired length of time, and is further adapted to control the transfer of energy from the engine to the energy storage unit to store the determined amount of energy.

8. The thermal management system of claim 1, wherein the controller includes an engine controller and an energy storage unit controller.

9. The thermal management system of claim 1, wherein the energy storage unit is one of an electrical energy storage unit and a thermal energy storage unit.

10. The thermal management system of claim 1, further including a variable speed compressor associated with the temperature control unit, the controller being adapted to control the compressor to operate at a first compressor speed when the engine is operating at a first efficiency level, and to control the compressor to operate at a second, different compressor speed when the engine is operating at a second, different efficiency level.

11. A method for managing a thermal system for a vehicle, comprising:
   generating energy with an engine;
   transferring the energy from the engine to an energy storage unit;
   storing the transferred energy in the energy storage unit;
   selectively drawing the stored energy from the energy storage unit to control a temperature in the vehicle when the engine is not operating;
   monitoring an operating condition of the system; and
   controlling the transfer of the energy from the engine to the energy storage unit based on the monitored operating condition.

12. The method of claim 11, wherein the monitored operating condition is an efficiency level of the engine, and the method further includes transferring the energy from the engine to the energy storage unit when the engine is operating above a threshold efficiency level.

13. The method of claim 12, further including transferring the energy from the engine to the energy storage unit when the energy level in the energy storage unit falls below a threshold energy level.

14. The method of claim 11, wherein the monitored operating condition is an energy level of the energy storage unit, and the method further includes turning off the engine and deactivating the transfer of energy when the energy level of the energy storage unit reaches a threshold energy level.

15. The method of claim 14, further including starting the engine and activating the transfer of energy when the energy level of the energy storage unit falls below a threshold energy level.

16. The method of claim 11, further including:
   receiving a command as an input from an operator interface; and
   automatically controlling the transfer of the energy from the engine to the energy storage unit in response to the command.

17. The method of claim 16, wherein the command is a desired length of time for maintaining the temperature, and the method further includes:
   determining an amount of energy required to maintain the temperature for the desired length of time; and
   storing the determined amount of energy.

18. The method of claim 11, wherein a variable speed compressor is associated with the temperature control unit, the method including
   operating a variable speed compressor associated with the temperature control unit at a first compressor speed when the engine is operating at a first efficiency and operating the compressor at a second, different compressor speed when the engine is operating at a second, different efficiency.

19. An on-highway truck, comprising:
   an operator compartment; and
   a thermal management system including
      an engine operable to generate energy,
      an energy storage unit associated with the engine and adapted to receive and store energy generated by the engine,
      a temperature control unit associated with the energy storage unit and adapted to control a temperature in the operator compartment, the temperature control unit being adapted to selectively draw stored energy from the energy storage unit to control the temperature when the engine is not operating, and
      a controller adapted to monitor an efficiency level of the engine and an energy level of the energy storage unit, the controller being adapted to automatically transfer energy from the engine to the energy storage unit when the engine is operating above a threshold efficiency level and the energy level of the energy storage unit is below a threshold energy level.

20. The on-highway truck of claim 19, wherein the controller is further adapted to turn off the engine and stop the transfer of energy when the energy level of the energy storage unit reaches a second threshold energy level.

21. The on-highway truck of claim 20, wherein the controller is further adapted to start the engine and transfer energy when the energy level of the energy storage unit falls below a threshold energy level.

22. The on-highway truck of claim 19, further including an operator interface in communication with the controller, the operator interface being configured to receive a command as an input from an operator and send the command to the controller, wherein the controller is adapted to automatically control the transfer of the energy from the engine to the energy storage unit in response to the command.

* * * * *